US011353969B2

(12) United States Patent
Stringer (10) Patent No.: US 11,353,969 B2
(45) Date of Patent: *Jun. 7, 2022

(54) DYNAMIC VISUAL INDICATIONS FOR INPUT DEVICES

(71) Applicant: Apple Inc., Cupertino, CA (US)

(72) Inventor: Christopher J. Stringer, Woodside, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/009,682

(22) Filed: Sep. 1, 2020

(65) Prior Publication Data

US 2020/0401243 A1    Dec. 24, 2020

Related U.S. Application Data

(63) Continuation of application No. 16/041,682, filed on Jul. 20, 2018, now Pat. No. 10,795,460, which is a continuation of application No. 13/896,926, filed on May 17, 2013, now Pat. No. 10,055,030.

(51) Int. Cl.
*G06F 3/0354* (2013.01)
*G06F 3/0488* (2022.01)
*G06F 3/044* (2006.01)

(52) U.S. Cl.
CPC .......... *G06F 3/03545* (2013.01); *G06F 3/044* (2013.01); *G06F 3/0441* (2019.05); *G06F 3/0442* (2019.05); *G06F 3/0488* (2013.01)

(58) Field of Classification Search
CPC .... G06F 3/03545; G06F 3/044; G06F 3/0441; G06F 3/0442; G06F 3/0488
See application file for complete search history.

(56) References Cited

U.S. PATENT DOCUMENTS

| 5,583,560 A | 12/1996 | Florin et al. |
| 5,726,645 A | 3/1998 | Kamon et al. |
| 5,953,001 A | 9/1999 | Challener et al. |
| 6,069,567 A | 5/2000 | Zawilski |
| 6,072,474 A | 6/2000 | Morimura et al. |
| 6,477,117 B1 | 11/2002 | Narayanaswami et al. |

(Continued)

FOREIGN PATENT DOCUMENTS

| FR | 2801402 A1 | 5/2001 |
| GB | 2433211 A | 6/2007 |

(Continued)

OTHER PUBLICATIONS

IBM, "Additional Functionality Added to Cell Phone via 'Learning' Function Button," www.ip.com, 2 pages, Feb. 21, 2007.

(Continued)

*Primary Examiner* — Chun-Nan Lin (74) *Attorney, Agent, or Firm* — BakerHostetler (57) ABSTRACT

An input device for providing input to a computing device. The input device includes a body, a visual element, and a processing element in communication with the visual element. The processing element dynamically changes a graphic displayed by the visual element to correspond to presentation data corresponding to the input device as presented to the computing device. The dynamic changes in the graphic provide indication to a user regarding the current state of the input device.

20 Claims, 9 Drawing Sheets

(56) References Cited

U.S. PATENT DOCUMENTS

| | | |
|---|---|---|
| 6,556,222 B1 | 4/2003 | Narayanaswami |
| 6,646,635 B2 | 11/2003 | Pogatetz et al. |
| 6,794,992 B1 | 9/2004 | Rogers |
| 6,909,378 B1 | 6/2005 | Lambrechts et al. |
| 6,914,551 B2 | 7/2005 | Vidal |
| 6,961,099 B2 | 11/2005 | Takano et al. |
| 6,998,553 B2 | 2/2006 | Hisamune et al. |
| 7,081,905 B1 | 7/2006 | Raghunath |
| 7,167,083 B2 | 1/2007 | Giles |
| 7,274,303 B2 | 9/2007 | Dresti et al. |
| 7,605,846 B2 | 10/2009 | Watanabe |
| 7,634,263 B2 | 12/2009 | Louch et al. |
| 7,710,456 B2 | 5/2010 | Koshiba |
| RE41,637 E | 9/2010 | O'Hara et al. |
| 7,791,597 B2 | 9/2010 | Silverstein et al. |
| 8,312,495 B2 | 11/2012 | Vanderhoff |
| 8,410,971 B2 | 4/2013 | Friedlander |
| 9,195,351 B1 | 11/2015 | Rosenberg et al. |
| 2003/0107558 A1 | 6/2003 | Bryborn |
| 2005/0057535 A1 | 3/2005 | Liu et al. |
| 2007/0013775 A1 | 1/2007 | Shin |
| 2007/0050054 A1 | 3/2007 | Sambandam Guruparan et al. |
| 2007/0124772 A1 | 5/2007 | Bennett et al. |
| 2007/0229671 A1 | 10/2007 | Takeshita et al. |
| 2008/0048991 A1 | 2/2008 | Freeman et al. |
| 2008/0297372 A1 | 12/2008 | Wouters |
| 2009/0146975 A1* | 6/2009 | Chang ............... G06F 3/03545 345/179 |
| 2009/0201420 A1 | 8/2009 | Brown et al. |
| 2009/0213070 A1 | 8/2009 | Kalaldeh et al. |
| 2009/0217207 A1 | 8/2009 | Kagermeier et al. |
| 2009/0251337 A1 | 10/2009 | Marggraff et al. |
| 2009/0285443 A1 | 11/2009 | Camp, Jr. et al. |
| 2009/0322583 A1 | 12/2009 | Reams et al. |
| 2010/0021022 A1 | 1/2010 | Pittel et al. |
| 2010/0033430 A1 | 2/2010 | Kakutani et al. |
| 2010/0053468 A1 | 3/2010 | Harvill |
| 2010/0081375 A1 | 4/2010 | Rosenblatt et al. |
| 2011/0007037 A1 | 1/2011 | Ogawa |
| 2011/0037609 A1 | 2/2011 | Kim et al. |
| 2011/0298709 A1* | 12/2011 | Vaganov ............. G06F 3/03546 345/158 |
| 2012/0041925 A1 | 2/2012 | Pope et al. |
| 2012/0068833 A1 | 3/2012 | Rothkopf et al. |
| 2012/0068857 A1 | 3/2012 | Rothkopf et al. |
| 2012/0075082 A1 | 3/2012 | Rothkopf et al. |
| 2012/0302167 A1 | 11/2012 | Yun et al. |
| 2013/0107144 A1* | 5/2013 | Marhefka ............. G06F 1/3275 349/12 |
| 2013/0201162 A1 | 8/2013 | Cavilia |
| 2014/0168176 A1 | 6/2014 | Nowatzyk et al. |
| 2014/0176559 A1* | 6/2014 | Yoo ......................... G06F 3/048 345/441 |
| 2014/0253468 A1* | 9/2014 | Havilio ............... G06F 3/03545 345/173 |
| 2014/0340318 A1 | 11/2014 | Stringer |
| 2015/0041289 A1 | 2/2015 | Ely |

FOREIGN PATENT DOCUMENTS

| | | |
|---|---|---|
| WO | WO 2010/058376 A2 | 5/2010 |
| WO | WO 2011/069567 A1 | 6/2011 |
| WO | WO 2012/083380 A1 | 6/2012 |

OTHER PUBLICATIONS

Tran et al., "Universal Programmable Remote Control/Telephone," www.ip.com, 2 pages, May 1, 1992.

Unknown, "Re iPhone Universal Remote Control—Infrared Remote Control Accessory for iPhone and iPod touch," http://www.amazon.com/iPhone-Universal-Remote-Control-Accessory/dp/tech-data/B0038Z4 . . . , 2 pages, at least as early as Jul. 15, 2010.

* cited by examiner

DYNAMIC VISUAL INDICATIONS FOR INPUT DEVICES

CROSS-REFERENCE TO RELATED APPLICATIONS

This application is a continuation of U.S. patent application Ser. No. 16/041,682, filed Jul. 20, 2018, and titled "Dynamic Visual Indications for Input Devices," which is a continuation of U.S. patent application Ser. No. 13/896,926, filed May 17, 2013 and titled "Dynamic Visual Indications for Input Devices," the disclosure of each of which is hereby incorporated herein in its entirety.

TECHNICAL FIELD

The present invention relates generally to computing devices, and more specifically, to input devices for computing devices.

BACKGROUND

Many types of input devices may be used to provide input to computing devices, such as buttons or keys, mice, trackballs, joysticks, touch screens and the like. Touch screens, in particular, are becoming increasingly popular because of their ease and versatility of operation. Typically touch screens on interfaces can include a touch sensor panel, which may be a clear panel with a touch-sensitive surface, and a display device that can be positioned behind the panel so that the touch-sensitive surface substantially covers the viewable area of the display device. Touch screens allow a user to provide various types of input to the computing device by touching the touch sensor panel using a finger, stylus, or other object at a location dictated by a user interface being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Some input devices, such as styli, allow a user to use the input device as a pen or pencil and "write" on the touch screen or other input-ready display. Often the output of a stylus, as displayed on the screen, may be varied. For example, the color or line thickness corresponding to the input of the stylus may be varied. These variations are typically done by the computing device and thus the user may not know what the output of the input device will be until the output is displayed on the screen.

SUMMARY

One example of the present disclosure includes an input device for providing input to a computing device. The input device includes a body, a visual output element, and a processing element in communication with the visual component. The processing element dynamically changes a graphic displayed by the visual component to correspond to presentation data corresponding to the input device as provided to the computing device. The dynamic changes in the icon provide indication to a user regarding one or more characteristics of presentation data of the input device.

Another example of the disclosure includes a stylus for providing input to a computing device in communication with a screen. The stylus includes a body configured to be gripped or held in the hand of a user, a tip connected to a first end of the body, and a display connected to the body, the display providing a visual output including a graphic. The graphic on the display changes dynamically to correspond to an output of the stylus on the screen.

Yet another example of the disclosure includes an input system. The input system includes a computer having a processor, a touch screen in communication with the processor, and a stylus configured to communicate with the computer via the touch screen. The stylus includes a body configured to be gripped by a user, a tip connected to a first end of the body, and an graphic display connected to the body, the graphic display providing a visual output including a graphic, wherein the graphic corresponds to an output of the stylus on the touch screen.

SPECIFICATION

Overview

In some embodiments herein, an input device operative with a computing device is disclosed. The input device may, for example, be configured for inputting operations relative to the computing device. In one embodiment, the input device may have a dynamically variable indication or feedback to alert a user to the state of the input device relative to the computing device. For example, the variable indication provides feedback to the user regarding presentation data, such as graphics, lines, etc. corresponding to the input of the input device that may be displayed by the computing device. As used herein the term presentation data is meant to correspond to substantially any type of data that is displayed or provided to the computing device that corresponds to an input of the input device. For example, during a note taking application presentation data corresponding to the input device may be one or more lines displayed on a display screen. As another example, during a painting application presentation data may include a spray pattern graphic.

In one embodiment, the input device may take the form of a stylus that may be used to provide inputs to a computing device so as to effect data being presented by the computing device. The stylus may interface with the computing device to interact with a display of the computing device. The interface may be provided by a variety of mechanisms including a touch or near touch interface such as a touch pad or touch screen. It my also be provided through a wired or wireless connection as, for example, USB or Bluetooth. The input device includes a visual component that displays a varying graphic element, such as an icon, character, or the like. The varying graphic element corresponds to, or changes with presentation data corresponding to the input data as presented on the computing device. The visual component may, for example, be a display screen and the varying graphic may be an icon or other user interface (UI) element that is presented on the display screen of the computing device.

In embodiments where the presentation data corresponding to input from the input device varies due to a user input, the graphic on the input device also varies with changes to the user input. As one example, an increase of pressure applied to the tip of the input device changes presentation data displayed on the computing device corresponding to the input device (e.g., a thicker line on the display screen). In this example, as the pressure increases on the tip, the graphic varies to indicate to the user that the state or input of the stylus has changed. Additionally or alternatively, the graphic may be varied based on a direct user input, such as selecting a button to vary the output of the input device.

In some embodiments, the input device may include one or more sensors that may detect changes in a user input. For example, the input device may include a pressure sensor that detects when a user is pressing the input device with an increased or decreased force against the screen of the computing device. As another example, the input device may include an orientation sensor, such as a gyroscope or accelerometer, which detects when a user has tilted the input device at a particular angle or range of angles relative to the screen. The sensors can be used to change the input of the input device provided to the computing device to vary the presentation data, as well as one or more characteristics of the variable graphic displayed on the visual component.

The variable graphic may be updated substantially simultaneously with the change in input, such that the input device provides a dynamically variable indication to a user regarding the presentation data corresponding to the input device. Other characteristics or parameters of user input to the input device may be tracked, which may result in varying the presentation data and variable graphic. As one example, speed, time, or distance may be tracked to vary the variable graphic or presentation data. Containing with this example, the time that the input device is positioned at a location (e.g., on one side of a screen) can be used to change the presentation data (e.g., an illustrated line may "pool" ink or the like the longer the input device remains at a particular location) or the speed at which a user moves the input device across a surface may vary the line thickness or darkness (e.g., faster speed results in a thinner and/or lighter line).

Additionally, the variable graphic may be configured to directly correspond to the input provided by the input device. As an example, one or more characteristics of the variable graphic may correspond to one or more characteristics of presentation data displayed on the computing device. In one embodiment, the width or diameter of the graphic may increase as the presentation data corresponding to the input device becomes thicker or wider on the screen. As an example, as the thickness of a displayed line increases (such as due to an increase in pressure applied to the tip or nib of the input device), the graphic increases in thickness as well. The thickness increase for the graphic and the displayed line may directly correspond to one another (e.g., 1:1 match) or may be indirectly related. By changing the graphic to correspond to the presentation data, the user is provided with dynamic indication, both on the display screen and on the input device regarding the state of the input device and/or presentation data corresponding to the input device, as he or she uses the input device. This allows the input device to be used on surfaces that do not directly display the input provided by the input device, (such as an opaque screen positioned on a touch panel), while still providing the user information regarding the state of the input device. Additionally, the dynamic indication eliminates the need for "test" strokes, where the user has to provide input to the computing device with the input device to see the characteristics of the presentation data corresponding to the input device.

In some embodiments, the input device may process user input to the device to determine whether it should change the input provided to the computing device. In these embodiments, the input device may be a "smart" device and provide data to the computing device regarding its current state and thus directly determine the presentation data to be displayed by the computing device. In other embodiments, the input device may relay user input to the computing device and the computing device may determine whether the state of the input device and/or the presentation data corresponding to the input device should be changed. In these embodiments, the input device may be a "dumb" device and the computing device may direct changes to the variable graphic and presentation data. In yet other embodiments, both the input device and the computing device may analyze one or more user inputs to the input device, as well as other data, to determine changes to the variable graphic and/or presentation data.

It should also be noted that the input device may include other types of feedback that may be provided to a user in addition to the visual graphic. For example, the input device may include one or more haptic elements that may vibrate, move, or otherwise provide tactile feedback to a user regarding the state of the input device. This may allow the user to experience both haptic and visual feedback as the presentation data corresponding to the input device changes.

Input and Computing Devices

Figure 1:
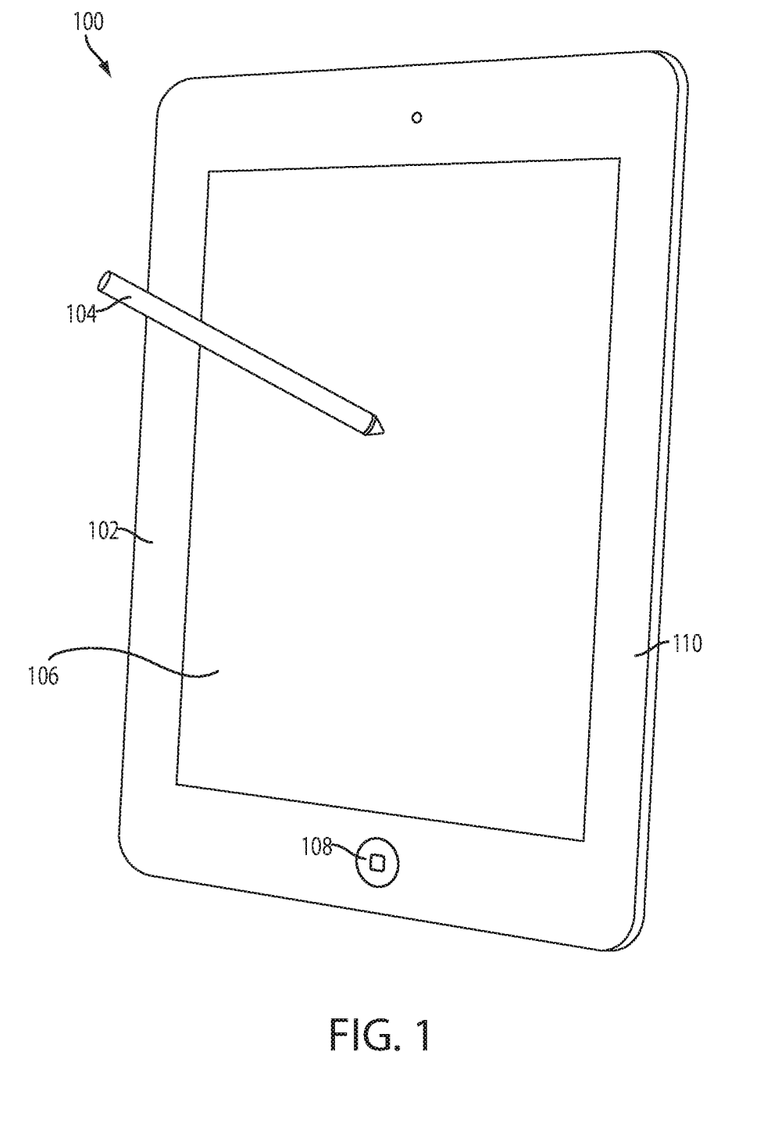
FIG. 1 is a perspective view of a system including a computing device and an input device communicating therewith.

Turning now to the figures, a communication system including a computing device and an input device will be discussed in more detail. FIG. 1 is a perspective view of an input system 100 including a stylus 104 in communication with a computing device 102 through a display screen 106. The system 100 and stylus 104 shown in FIG. 1 provide a dynamically variable indication regarding presentation data displayed on the computer display 106 corresponding to the stylus input to the computing device. For example, in some embodiments, the stylus may include a graphic display for presenting a graphic, such as an icon or character, corresponding to the presentation data and/or state of the stylus. The variable display and graphic will be discussed in more detail below with respect to FIGS. 2A-2C, but generally may be positioned substantially anywhere on the stylus and provide an indication to the user regarding the input of the stylus to the computer. It should be noted that although the embodiments discussed below are discussed with reference to a stylus, the techniques and methods disclosed herein may be used with a number of other types of input devices.

The computing device 102 may be substantially any type of electronic or computing device. Some non-limiting examples include a laptop computer, a tablet computer, a smartphone, a digital music player, portable gaming station, or the like. Although not shown, the computing device 102 may include one or more components of a typical electronic or computing device, such as one or more processing components, to provide control or provide other functions for the device 102, as well as one or more networking components. The input device may communicate with the computing device through a number of different mechanisms, such as, but not limited to, capacitive sensing, data transmission (wireless or wired), mechanical switches, or so on. The communication or network interface for the communication device may be selected based on the desired method or methods of communication between the input device and the computing device. For example, if the input device transmits data to the computing device via Bluetooth, the computing device may include a Bluetooth transmitter/receiver.

The computing device 102 may include the display screen 106, an enclosure 110, and/or one or more input buttons 108. The enclosure 110 encloses one or more components of the computing device 102, as well as may surround and/or secure a portion of the display screen 106 to the computing device 102. The one or more input buttons 108 may provide input functions to the computing device 102. For example, the input buttons 108 may return the computing device to a home screen or state, adjust a volume for the computing device 102, turn the computing device 102 on or off, or may provide other inputs for the computing device 102.

The display screen 106 may be integrated with the computing device 102, such as a tablet computer, or may be separate from the computing device, such as a stand alone monitor. Alternatively or additionally, the computing device may include a projection component or the like that projects a visual output for the computing device onto another object or the like (e.g., holograph or projection screen). The display screen 106 is configured to display one or more output images and/or videos for the computing device 102. The display screen 106 may be substantially any type of display mechanism, such as a liquid crystal display (LCD), screen, plasma display, or the like. In instances where the display screen 112 is a LCD display, the display screen 106 may include (not shown) various layers such a fluorescent panel, one or more polarizing filters, a layer of liquid crystal cells, a color filter, or the like.

In many embodiments, the display screen 106 may include one or more components to communicate with or detect inputs by the input device. For example, the display screen 106 may include one or more sensors in order to detect one or more input signals based on user touches or inputs from the stylus 104 or other input device. In particular, the display screen 106 is configured to receive inputs from an object (e.g., location information based on a user's finger or data from the input device) and to send this information to a processor. The display screen 106 may report touches to one or more processors and the processor interprets the touches in accordance with its programming. For example, the processor may initiate a task in accordance with a particular touch.

As a specific example, display screen 106 may include a touch interface, such as a multi-touch capacitive screen. For example, the display screen 106 may be configured to receive data, either digital or analog, from the stylus 104. As one example, the display screen may detect change in capacitance corresponding to a location of the stylus, as well as receive data transmitted via wirelessly or otherwise from the stylus. Additionally, the display screen 106 may include a screen to provide a graphical user interface, and other video and/or image output for the computing device 102.

Alternatively, the computing device and/or display screen may include other mechanisms for sensing a location of the input device or otherwise receiving data from the input device. For example, the computing device may user near-touch to detecting the input device as it hovers above the display screen 106. Additionally, it should be noted that the display screen may be a holographic display or other visual projection onto a surface and may not necessarily include a "screen." In these embodiments, the position of the stylus may be determined relative to a predetermined location and the movement of the stylus may be tracked relative to the predetermined location rather than on top of a screen or other component.

The Input Device

Figure 2A:
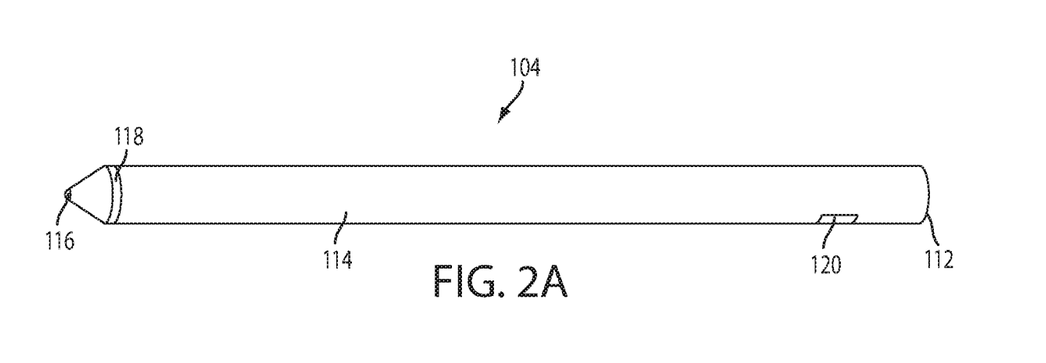
FIG. 2A is a front perspective view of the input device of FIG. 1.
Figure 2B:
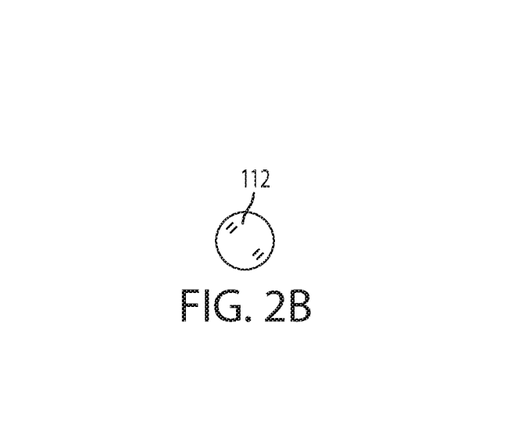
FIG. 2B is a rear plan view of the input device.

Turning now to FIGS. 2A and 2B a first example of the stylus 104 will be discussed in more detail. FIG. 2A is a perspective view of the stylus 104. FIG. 2B is a rear plan view of the stylus. The stylus 104 may include a generally elongated body 114 and a tip or nib 116 extending from or connected to one end of the body 114. The body 114 may be a generally cylindrically shaped member, such as a pen, and can be held in the hands of a user. The nib 116 or tip is used to interact with the computing device 102. The nib 116 may be rolled, pressed, or otherwise moved across the display screen 106. For example, the nib 116 may be a ball, a flexible tip, a deformable tip, a plurality of flexible elements, and the like. The nib 116 may be interchangeable, extendable, or the like, to allow the input device 104 to have a variety of output characteristics, as will be discussed in more detail below. The nib 116 may extend through a nib aperture defined on a first end of the stylus 104 or may be integrally formed with the body 114.

In some embodiments, the nib 116 may be a generally flexible material that may deform upon pressure and resiliently return to an original shape. The nib 116 may be made of metals such as aluminum, plastic, silicon, brass or steel, as well as conductive rubber, plastic or other materials doped with conductive particles. In one embodiment the nib 116 may be Mylar, which may have sufficient conductive particles to interact with a capacitive touch screen, but may also be flexible.

Movement of the nib 116 is correlated to presentation data presented on the display screen 106 through a variety of different manners. The nib 116 may be configured to be slid or traced along the surface of the display screen 106, and interact therewith. For example, the nib 116 may be formed from a conductive material, or another material laced with a conductive material, in order to may interact with the display screen 106 to provide input to the computing device 102. In some embodiments, the nib 116 may be configured to vary an electrical parameter, such as a capacitance, at one or more locations of the display screen 106, which may provide an input to the display screen 106. For example, as the nib 116 contacts the surface of the display screen 106, the display screen 106 may receive a touch input. In another example, nib 116 transfers data to the screen 106 to indicate the location of the nib 116. In this example, the position of nib may be sent to the computing device 102 from the stylus 104. In other examples, the output of the stylus 104 on the display 106 may be determined both by the computing device 102 sensing one or more parameters of the stylus (e.g., capacitance changes), as well as the stylus transmitting data to the computing device.

It should be noted that the techniques discussed herein can be applied to substantially any type of input device for interacting with a computing device. As such, the data transfer techniques between the stylus 104 and the computing device may be selected as desired and the examples discussed herein are meant as illustrative only.

In some embodiments, a graphic display 112 is included on a back end of the body 114. The graphic display 112 is a visual output element, such as a liquid crystal display screen, electronic ink (e-ink) screen, organic light emitting diode (OLED) or diodes, light emitting diode or diodes, or the like. Additionally, in some embodiments, the graphic display may include one or more sensing elements, such as touch sensors or the like, that may detect a user input. In these embodiments, the graphic display may detect user input in addition to displaying the current state of the input device. For example, the user may press the graphic display or one or more graphics displayed thereon, to select or vary an input characteristic of the input device.

With reference to FIG. 2B, in one embodiment, the graphic display 112 forms a back end of the body 114. The graphic display may correspond to a general shape of the body 114 and/or back end of the body 114. For example, in instances where the body 114 is generally cylindrically shaped, the graphic display 112 may similarly be circularly shaped. The graphic display 112 generally provides visual indication regarding the current state of the stylus 104.

Figure 2C:
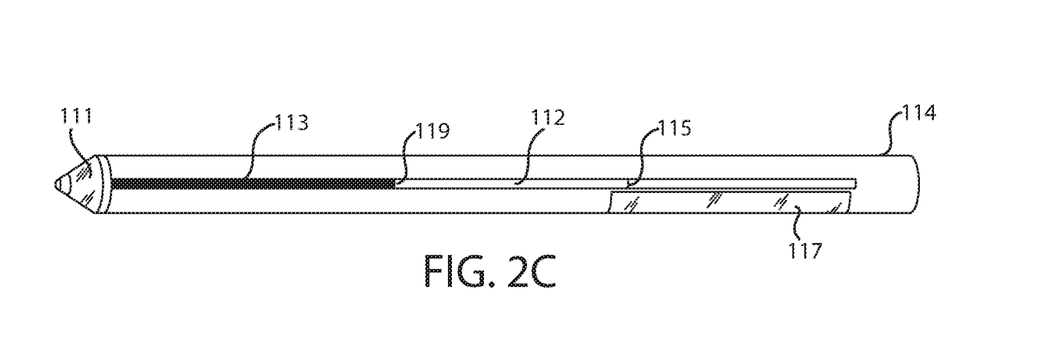
FIG. 2C is a side view of one embodiment of the sample input device.

Although the graphic display 112 is illustrated as being positioned on a back end of the body 114, the graphic display 112 may be located on other areas of the stylus 104. In other words, based on the shape of the body 114, size of the stylus 104, and other design parameters, the graphic display 112 may be otherwise positioned on the stylus 104. FIG. 2C is a side elevation view of another example of the stylus shown in FIG. 1. As some examples, with reference to FIG. 2C, the graphic display 112 may be positioned near or surrounding the tip of the body 114, along a length of the body 114, or within the body. With reference to FIG. 2C, the graphic display 112 may be positioned within the body 114 and extend longitudinally along a length of the input device. In this embodiment, the body 114 may be completely transparent or may include a window or aperture to allow the graphic display to be visible through the body 114. Additionally, with continued reference to FIG. 2C, the input device may include two or more graphic displays, such as the graphic display 112 on the back end of the device, a second display 111 surrounding the nib, and a third display 117 positioned on a side of the body 114. In these embodiments, each display may display a graphic corresponding to different parameters of the input device (e.g., one displays line thickness and one displays color).

With reference again to FIG. 2A, the stylus 104 may also include one or more input switches 118, 120. In one embodiment, a first input switch 118 may be used to change a mode or a characteristic of the stylus 104. For example, the first input switch 118 may be used to vary a displayed color, line thickness, opacity, number of output lines, etc., of the presentation data corresponding to the stylus input to the computing device. In this embodiment, a second input switch 120 may be used to selectively activate the stylus 104 or may be used to change other characteristics of the stylus 104. The two input switches 118, 120 may be mechanical switches or may be electrical switches. As some examples, the input switches 118, 120 may be rotatable rings, compressible buttons, capacitive sensors, or substantially any other element configured to detect a user input. Additionally, it should be noted that although the stylus 104 is illustrated as having two input switches 118, 120, the input switches 118, 120 may be omitted or there may be fewer or more switches than illustrated. Moreover, the location of the switches 118, 120 may be varied as desired.

Figure 3:
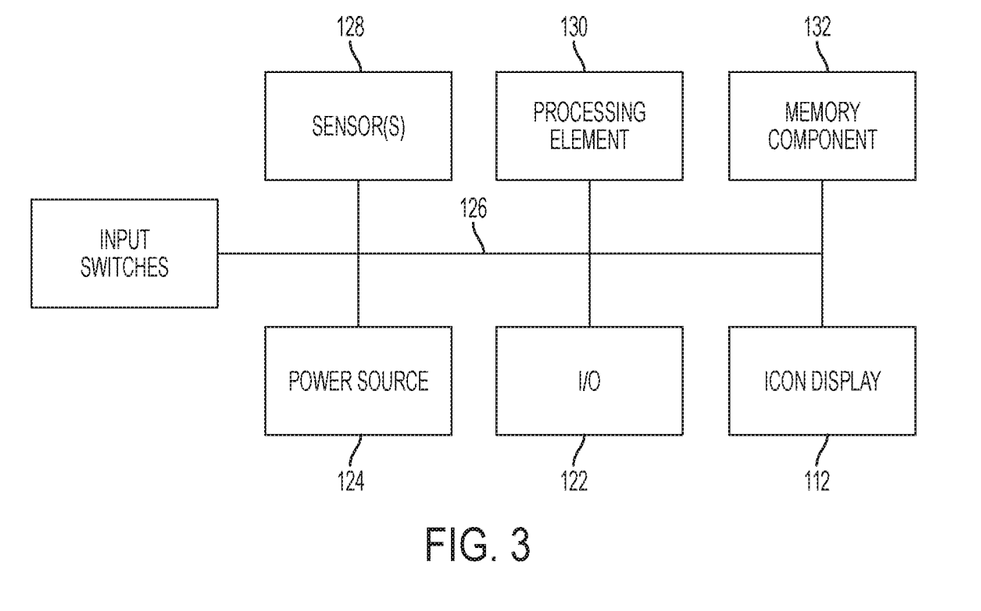
FIG. 3 is a simplified block diagram of the input device of FIG. 1.

The stylus 104 may also include one more sensors and/or processing elements. FIG. 3 is a simplified block diagram of the stylus 104. With reference to FIG. 3, the stylus 104 may include one or more sensors 128, a power source 124, an input/output (I/O) component 122, one or more processing elements 130, and/or a memory component 132. Each of the components of the stylus 104 may be in communication with one another through one or more systems buses 126 or other communication wires or elements. Additionally, the components of the stylus may be in communication with the computing device 102. The components of the stylus 104 can be varied depending on the desired performance and output characteristics of the stylus 104. For example, in instances where the stylus 104 may be a "dumb" or non-processing device and transmit data to the computing device for analysis, the stylus 104 may not include a processing element or may include a processing element that completes basic instructions.

With continued reference to FIG. 3, the I/O component 122 receives and/or transmits one or more signals to and from the stylus 104. For example, the I/O component 122 may receive one or more radio signals (e.g., Wi-Fi, Bluetooth), or may be configured to receive one or more electrical (digital and/or analog) signals transmitted from the computing device 102. In the latter example, the I/O component 122 may be used in conjunction with the nib 116 to transmit and/or receive signals from the display screen 106. For example, the I/O component 122 may be configured to receive one or more voltage signals from the display screen 106 (e.g., through the drive lines for a capacitive touch screen). As another example, the I/O component 122 may be configured to transfer data directly to the computing device 102. An example of this type of data transfer is shown U.S. patent application Ser. No. 13/560,963 filed on Jul. 27, 2012 and entitled, "Device for Digital Communication through Capacitive Coupling," incorporated by reference herein. In yet other embodiments, the I/O component may be a wired connection, such as a universal serial bus port, that may transmit data through a cable between the stylus and the computing device.

The power source 124 provides power to one or more components of the stylus 104. The power source 124 may be rechargeable or replaceable. For example, the power source 124 may be a rechargeable battery or a one-use battery. In another example the power source 124 may include a wire or other communication element to receive power from an external source, such as from the computing device 102 or a wall outlet.

The one or more sensors 128 detect one or more characteristics of the stylus 104 or a user input to the stylus 104. For example, the one or more sensors 128 may include a pressure or force sensor, timer, a capacitive sensor, an accelerometer, a gyroscope, or the like. The one or more sensors 128 can be configured to detect a variety of characteristics, such as, but not limited to, pressure exerted on the nib 116, pressure exerted on the body 114, an angle or tilt of the body 114 or nib 116 relative to the screen 106, a user's grip on the body 114, the orientation of the stylus 104, the number of fingers the user is using to hold the stylus 104, changes in force or pressure exerted on any portion of the stylus 104, and so on. Depending on the desired characteristic to be sensed, the sensors 128 may be positioned substantially anywhere on the stylus 104.

The sensors 128 are in communication with the processing element 130. The processing element 130 is substantially any type of device that can receive and execute instructions. As an example, the processing element 130 may be a processor, microcomputer, or two or more processing elements. The processing element 130 receives input from the one or more input switches 118, 120 and sensors 128 to control the stylus 104. As an example, the processing element 130 receives data from the sensors 128 to determine an output for the graphic display 112.

The stylus 104 may also include one or more memory components 132. The memory components 132 may be substantially any type of device that can store data. In some embodiments, the memory component 132 stores data from the one or more sensors 128 and/or input switches 118, 120 and provides the data to the processing element 130 and/or I/O 122.

As briefly discussed above, the stylus 104 provides dynamic indication to a user regarding one or more characteristics of the stylus 104. With reference to FIG. 2C, in one embodiment, the graphic display 112 may display a color or line that corresponds to an ink color, ink thickness, battery level, or characteristics of presentation data or stylus parameters. In the example illustrated in FIG. 2C, the graphic display 112 may extend longitudinally along the length of the body 114. In one embodiment, the graphic 113 may represent the battery life remaining for the stylus 104 and when fully charged the graphic 113 may extend to the full level 115 and as the stylus 104 looses charge (due to use or the like), the graphic 113 may decrease in length and be positioned at a second line 119 along the length of the graphic display 112. In this manner the graphic 113 may dynamically illustrate to a user the current state of the battery similarly to a manner that conventional pens illustrate the ink level to a user.

With continued reference to FIG. 2C, additionally or alternatively, the graphic 113 may change color, diameter, or the like, to correspond with presentation data corresponding to the stylus 104. For example, when the presentation data on the computing device corresponding to the stylus 104 is a purple color, the graphic 113 may turn purple. As another example, when the presentation data is a line, the graphic 113 may have a diameter corresponding to the diameter of the presentation data. As will be discussed in more detail below, the graphic may dynamically vary with changes to one or more changes in parameters input to the stylus (such as a change in pressure) or with changes to presentation data corresponding to the stylus (such as line color or thickness).

Figure 4A:
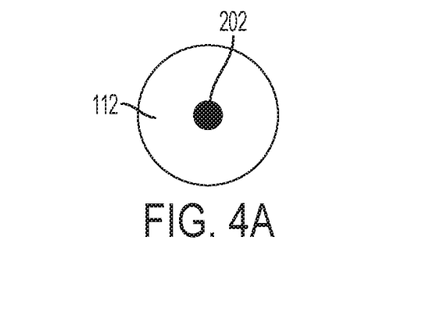
FIG. 4A is a top plan view of an graphic display of the input device displaying a first graphic.
Figure 4B:
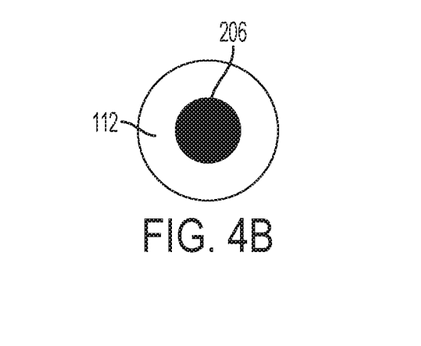
FIG. 4B is a top plan view of the graphic display of the input device displaying a second graphic.
Figure 4C:
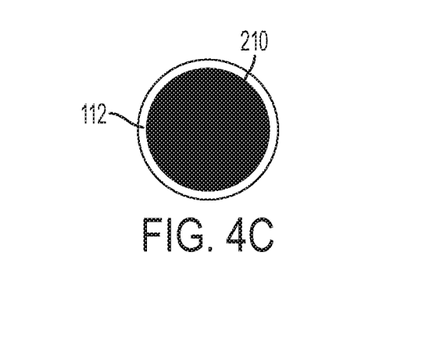
FIG. 4C is a top plan view of the graphic display of the input device displaying a third graphic.
Figure 5A:
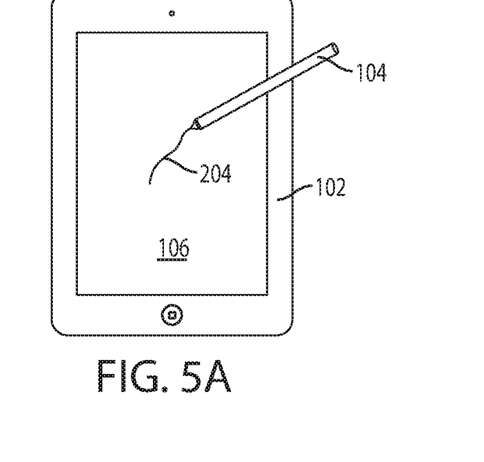
FIG. 5A is a perspective view of the input device providing a first input to the computing device, the first input corresponding to the first graphic in FIG. 4A.
Figure 5B:
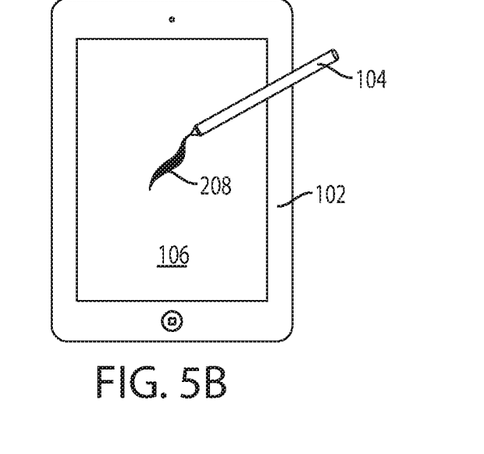
FIG. 5B is a perspective view of the input device providing a first input to the computing device, the first input corresponding to the first graphic in FIG. 4B.
Figure 5C:
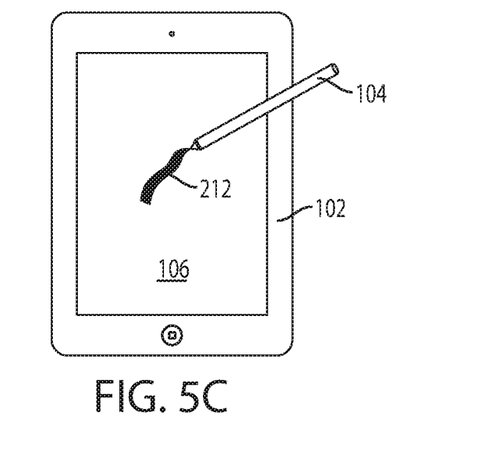
FIG. 5C is a perspective view of the input device providing a first input to the computing device, the first input corresponding to the first graphic in FIG. 4C.

Other examples of the graphic on the stylus corresponding to presentation data will now be discussed in more detail. FIGS. 4A-4C illustrate the graphic display 112 having a variable graphic displayed thereon. FIGS. 5A-5C illustrate the presentation data corresponding to the stylus in FIGS. 4A-4C. In the embodiment illustrated in FIGS. 5A-5C, the presentation data corresponding to the stylus is line presented on the display of the computer device. However, it should be understood that the examples illustrated in FIGS. 5A-5C are just one type of presentation data and many other embodiments are envisioned.

With initial reference to FIGS. 4A and 5A, the stylus 104 produces a first line 204 on the display 106 of the computing device 102 as the stylus 104 is moved across the display 106. The graphic display 112 provides a visual output of a first icon 202. The first icon 202 corresponds to the first line 204. For example, the first icon 202 may have substantially the same shape and diameter of the first line 204.

With reference to FIGS. 4B and 5B, as the state of the stylus 104 changes such as due to an increase of pressure applied by the user, other user input, or under the control of an application or program operating on the computing device, the graphic display 112 changes to display a second icon 206. The second icon 206 corresponds to the second line 208 displayed on the screen 106. In this example, the second line 208 increases in thickness and because the second icon 206 corresponds to the input of the stylus 104 as shown on the display 106 of the computer device, the diameter or thickness of the second icon 206 increases as well. In this manner, the second icon 206 may directly correspond to the input of the stylus 104 on the computing device 102 (e.g., through the display 106). In some embodiments, the graphic displayed may change prior to the presentation the display 106 changing. In these embodiments, the icon provides indication to the user regarding the presentation data corresponding to the stylus 104 on the computing device 102 prior to the user entering information into the display 106. As an example, the user may increase his or her pressure on the body 114 and the first icon 202 changes to the second icon 206 to illustrate to the user the characteristics of the line that will correspond to the stylus input to the computing device corresponding to the pressure exerted on the body 114.

With reference to FIGS. 4C and 5C, as one or more inputs to the stylus 104 continue to vary, the graphic display 112 may also continue to change the icon. As the output line increases, the second icon 206 may increase in diameter to change to a third icon 210. The third icon 210 corresponds to a third output line 212. Both the third icon 210 and the third output line 212 have an increased thickness as compared to the second icon 206 and second output line 208. As such, the graphic display 112 corresponds to the change in output of the stylus 104 as displayed by the computing device 102 on the display 106.

The changes between each icon 202, 206, 210 can occur dynamically and rapidly as the input characteristics of the stylus change 104, either due to a user input or instructions from the computing device 102. In this manner, the user can look to the graphic display 112 to receive indication regarding the current status of the stylus 104. Because the indication directly corresponds to the presentation data of the stylus 104 on the display 106, the user may not need to draw "test" lines or the like on the display 106 in order to understand the appearance characteristics of the stylus input. Also, the stylus may be used with a non-visible display or may be used separate from a display and the user will know one or more characteristics of the presentation data even though he or she may not see them on a display screen.

Figure 6A:
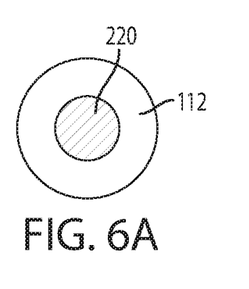
FIG. 6A is a top plan view of the input device including a graphic having a first color.
Figure 6B:
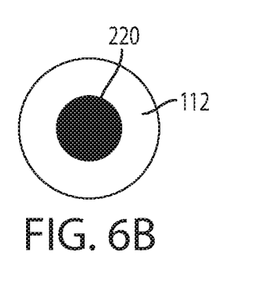
FIG. 6B is a top plan view of the input device including a graphic having a second color.

In addition to varying the thickness of the icon, the stylus 104 may also change other characteristics of the icon. With reference to FIG. 6A, the icon 220 has a first color (grey in this example) that corresponds to a color of presentation data for the stylus 104 as displayed on the display 106. Then, as the color of the stylus 104 changes, such as due to a user input to the computing device 102 or to the stylus 104 itself, the color of the icon 220 changes to a second color (black in this example). In this manner, the graphic display 112 includes a color display to indicate the current state of the stylus 104. It should be noted that the color input by the stylus 104 to the computing device may be changed by the user. As an example, the user provides an input to the stylus 104, such as through the one or more input switches 118, 120.

Alternatively or additionally, the computing device 102 can change the color of the stylus as presented on the display 106. As an example, an application may include a selectable item (such as a window or graphic on the display 106) that corresponds to a particular output color and when the stylus 104 provides input on the selectable item, the presented color of the stylus changes. In this example, the computing device 102 transfers data to the stylus 104 to indicate the color change, and that color change is communicated to the graphic display 112 to change the icon 220. In one implementation, the selectable item may be a paint can, a color box, or the like, and the user may press or hover the stylus over the selectable item to vary the presented color of the stylus.

In some embodiments, presentation data corresponding to the stylus 104 may include varying "brush strokes," tip size, and/or shapes. The shape of the presentation data may be changed physically or virtually. For example, the nib 116 may be extended, separated into a plurality of strands, or replaceable, and by changing the physical characteristics of the nib 116, the input of the stylus to the computing device may also change. In other examples, if the nib 116 changes virtually, the physical characteristics of the nib itself may not change, but the presentation data corresponding to the stylus 104 may change as displayed on the screen 106. As the nib 116 changes, either physically or virtually, the graphic display 112 may correspondingly vary the icon. FIGS. 7A-7F illustrate various icons displayed as the nib 116 changes. FIGS. 8A-8F illustrate the presentation data corresponding to the icons in FIGS. 7A-7F. As shown generally with reference to FIGS. 7A-8F, as the presentation data corresponding to the nib 116 changes, the icon changes correspondingly.

Figures 7A, 7C:
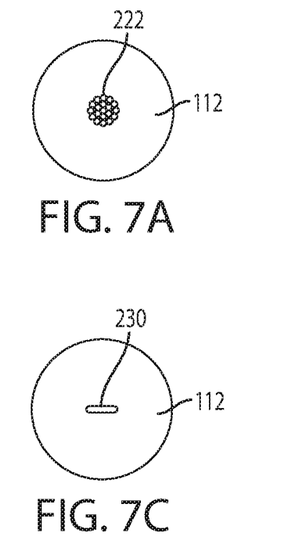
FIG. 7A is a top plan view of the input device illustrating a graphic corresponding to a paint brush output.
FIG. 7C is a top plan view of the input device illustrating a graphic corresponding to a solid line brush output.
Figure 8A:
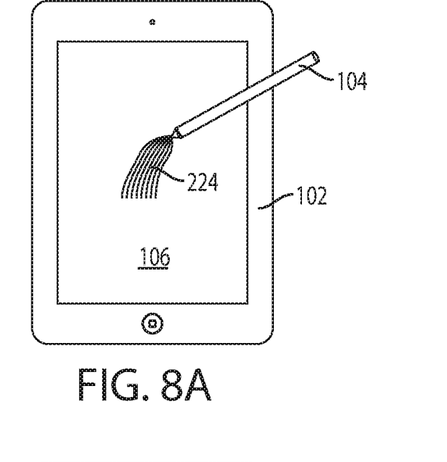
FIG. 8A is a perspective view of the input device providing a first input to the computing device, the first input corresponding to the first graphic in FIG. 7A.

With reference to FIGS. 7A and 8A, the nib 116 may have an input including a plurality of bristles 224 or strands. For example, the stylus 104 may be used in a paintbrush mode and the nib 116 may include multiple strands that fan out to simulate a paintbrush. In this mode, the graphic display 112 includes an icon 222 having a plurality of strands. The icon 222 may generally represent the presentation data, in this case a plurality of lines, corresponding to the nib 122.

Figures 7B, 7D:
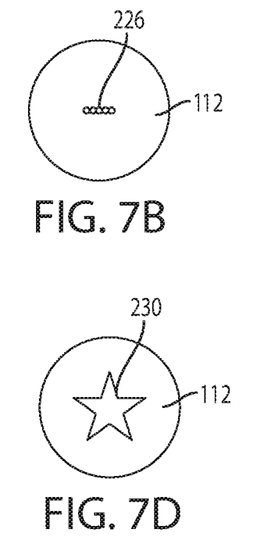
FIG. 7B is a top plan view of the input device illustrating a graphic corresponding to an angled brush output.
FIG. 7D is a top plan view of the input device illustrating a graphic corresponding to a star tip for the input device.
Figure 8B:
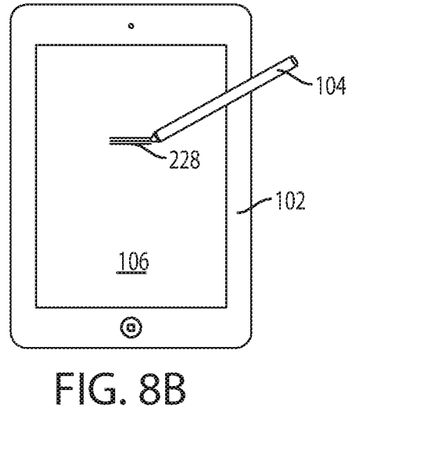
FIG. 8B is a perspective view of the input device providing a second input to the computing device, the second input corresponding to the second graphic in FIG. 7B.

With reference to FIGS. 7B and 8B, in some embodiments, the nib 116 may (either physically virtually) have a flat or angled brush input. In these embodiments, the icon 226 may have a plurality of strands aligned in a row and the presentation data 228 on the display 106 may include a plurality of strands aligned as well.

Figure 8C:
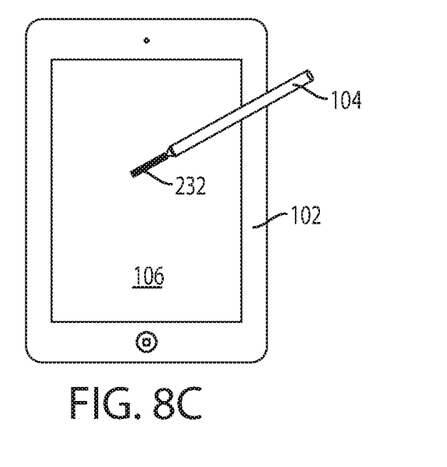
FIG. 8C is a perspective view of the input device providing a third to the computing device, the third input corresponding to the third graphic in FIG. 7C.

As yet another example, with reference to FIGS. 7C and 8C, the nib 116 may correspond to a presentation data input such as a rectangular tip. In this example, the icon 230 and the line 232 may both represent the rectangular characteristic of the nib 116.

Figure 8D:
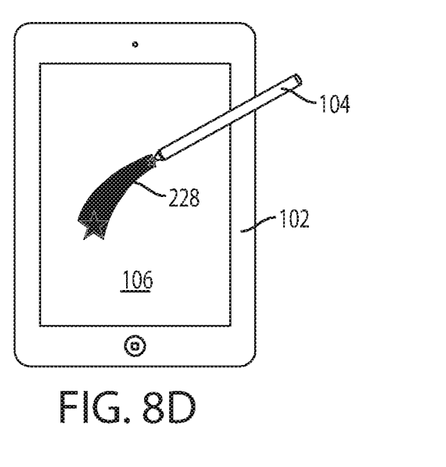
FIG. 8D is a perspective view of the input device providing a fourth input to the computing device, the fourth input corresponding to the fourth graphic in FIG. 7D.

With reference to FIGS. 7D and 8D, in one embodiment, the nib 116 may have a star shape. In this embodiment, the presentation data, in this case line 228, may be angled and similarly shaped to the nib 116. For example, line 228 may include five arms or points that each correspond to the star shape of the nib 116.

Figure 7E:
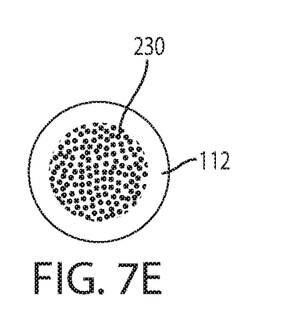
FIG. 7E is a top plan view of the input device illustrating a graphic corresponding to a spray output.
Figure 7F:
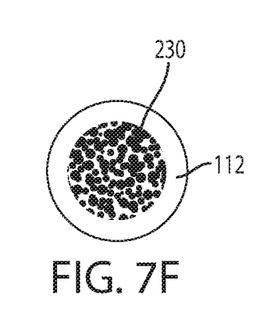
FIG. 7F is a top plan view of the input device illustrating a graphic corresponding a spray output having a denser spray pattern than the spray output of FIG. 7E.
Figure 8E:
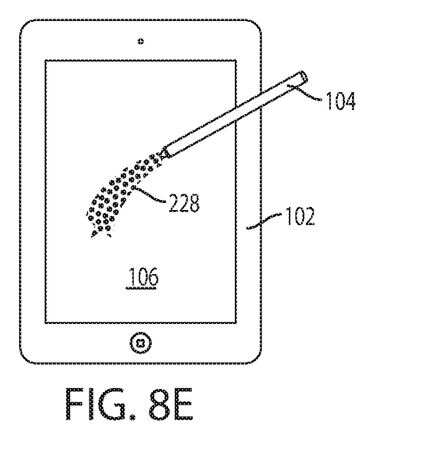
FIG. 8E is a perspective view of the input device providing a fifth input to the computing device, the fifth input corresponding to the fifth graphic in FIG. 7E.
Figure 8F:
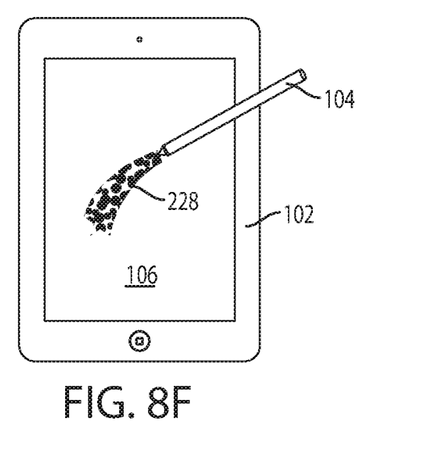
FIG. 8F is a perspective view of the input device providing a sixth input to the computing device, the sixth input corresponding to the sixth graphic in FIG. 7F.

In other embodiment, the presentation data may be a "spray" function, such as spray paint. With reference to FIGS. 7E and 8E in a first state, the stylus 104 may have a first spray 228 input and a first graphic 230 illustrating the density of the spray 228. As the stylus 104 provides input to the computing device 102, the spray 228 pattern may be presented on the display 106. As one or more characteristics of the stylus or user input to the stylus changes, the density or other characteristic of the spray presentation may vary. With reference to FIGS. 7F and 8F, in one example, the spray 228 may become denser, resulting in an increase in density to the graphic 230. In other words, as the presentation spray 228 becomes denser, the spray graphic 230 illustrated on the graphic display 112 may also become denser.

It should be noted that the example graphics and presentation data shown in FIGS. 4A-8F are meant as illustrative only. It is envisioned that many other types of presentation data and graphics envisioned and may be varied as desired. Additionally, the nib may include other types of shapes, sizes, or the like, e.g., the nib may include multiple tips, such as two prongs, and/or a quill shape. As an example, the stylus 104 may include a pen mode, pencil mode, and a marker mode. Continuing with this example, the icons may be shaped to correspond to the shape of the nib and/or the virtual material of the nib, e.g., during marker mode the icon may have a felt-like appearance, whereas in pencil mode the icon may have a lead or graphite appearance. In this example both the color, size, shape, shading, and other characteristics of the icon may be changed. As another example, the icon may display words, letters, numbers, or the like that correspond to presentation data presented on the display 106 corresponding to the input of the stylus 104. Continuing with this example, the icon may display a first number corresponding to a first line thickness and a second number corresponding to a second line thickness. In a pencil mode these icons may correspond to types of lead thickness that are used with mechanical pencils.

Figure 9:
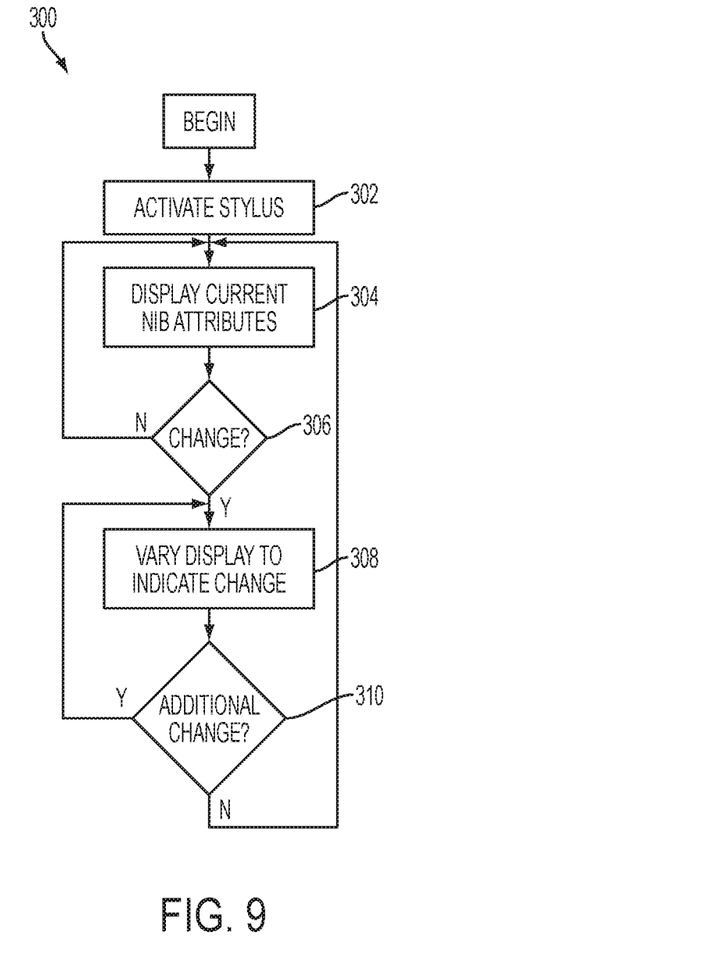
FIG. 9 is a flow chart illustrating a method for dynamically providing indication to a user using the input device.

An example method for changing the output of the graphic display 112 corresponding to of the state of the stylus 104 will now be discussed in more detail. FIG. 9 is a flow chart illustrating a method 300 for providing indication to a user with the stylus. The method 300 may begin with operation 302 and the stylus 104 is activated. The stylus 104 may be activated in a number of different manners, such as, but not limited to, the user selecting one of the input switches 118, 120 to turn on the power source 124, one of the sensors 128 detecting that the user is moving or gripping the stylus 104, or the computing device 102 may send a wake signal to the stylus 104 when the stylus 104 is within a certain distance from the device 102. Many other activation mechanisms are envisioned and the above listed examples are meant as illustrative only.

Once the stylus 104 has been activated, the method 300 proceeds to operation 304. In operation 304, the graphic display 112 displays a graphic, such as an icon, corresponding to the current presentation attributes of the nib 116. As discussed above, the presentation data corresponding to the nib 116 may include both physical and virtual attributes, such color, thickness, material type, number of bristles, and so on. Additionally, the presentation attributes of the nib 116 may also be based on one or more user inputs, such as pressure, velocity, grip, and so on. In one embodiment, the processing element 130 may determine the one or more presentation data based on data from the stylus 104 (e.g., the one or more sensors 128), as well as data from the computing device 102 (e.g., active application).

Once the graphic display 112 has been activated to display a graphic corresponding to the presentation data of the stylus 104, the method 300 may proceed to operation 306. In operation 306 the processing element 130 may determine whether there has been a change to the presentation data. The presentation data or stylus attributes may change for a number of different reasons, such as, but not limited to, user input to the stylus, user input to the computing device 102, sensed user input detected by the sensors 128, physical change to the stylus (e.g., replacing the nib), or the like. The type of parameters that may correspond to a change in the graphic display 112 may be varied based on the embodiment, type of computing device, and generally as desired. It should be noted that the stylus 104 can detect one or more changes at a time. For example, if the pressure exerted on the nib changes, along with an angle of the stylus 104 relative to the screen 106, both attributes may recognized as having been varied. As another example, in embodiments where the display screen 112 is a touch screen or otherwise can receive a user input, the user may press one or more locations of the graphic display 112 to provide input to the stylus 104. Continuing with this example, the user may press the graphic display 112 to change the color of the presentation data, the line width, the density, or other attributes of the presentation data.

If a change is not detected in operation 306, the method 300 returns to operation 304 and the graphic display 112 continues to display the current graphic. However, if a change is detected in operation 306, the method 300 proceeds to operation 308. In operation 308, the processing element 130 causes the graphic display 112 to vary the graphic to correspond to changed attribute. As an example, if an increase in pressure applied to the nib 116 is detected during operation 306, the graphic illustrated on the graphic display 112 may increase in width or darkness. As another example, if color was the changed attribute, the graphic display 112 will change the color of the graphic. Additionally, in instances where multiple attributes are changed simultaneously (or substantially simultaneously), each of the changes may be reflected in the change in the graphic. In other words, the graphic display 112 may vary the graphic to directly correspond to the state the stylus 104 and as multiple characteristics are changed, multiple characteristics of the graphic may also change.

After operation 308, the method 300 may proceed to operation 310. In operation 310, the processing element 130 may determine whether there are additional changes to the attributes of the presentation data or state of the stylus. Operation 308 may be substantially the same as operation 306. Alternatively, operation 306 may detect changes in a first set of attributes and in operation 310 a second set of attributes may be analyzed.

If there are no additional changes, the method 300 may return to operation 304 and the current graphic may continue to be displayed. However, if there are additional changes, the method 300 may return to operation 308 and the icon may be varied to highlight the new changes.

Using the method 300 and the stylus 104, the user receives dynamic indication that may be updated to correspond to the state of the stylus 104 and/or presentation data corresponding to the input of the stylus. The dynamic indication may allow a user to use the stylus 104 without requiring test strokes on the display 106 to check the presentation data corresponding to input of the stylus 104, as well as have a visual indication on the stylus of how his or her input to the stylus will vary the presentation data. Moreover, the visual indication provided by the graphic display 112 may allow the stylus 104 to be used to provide input to a non-visual display 106 or computing device 102 or may be used separate from the display 106, as the stylus itself can provide indication to the user regarding characteristics of the presentation data. Additionally, the position of the graphic display 112 on the back end of the stylus 104 may provide an intuitive location for the user to look when searching for indication of the stylus 104.

Figure 10:
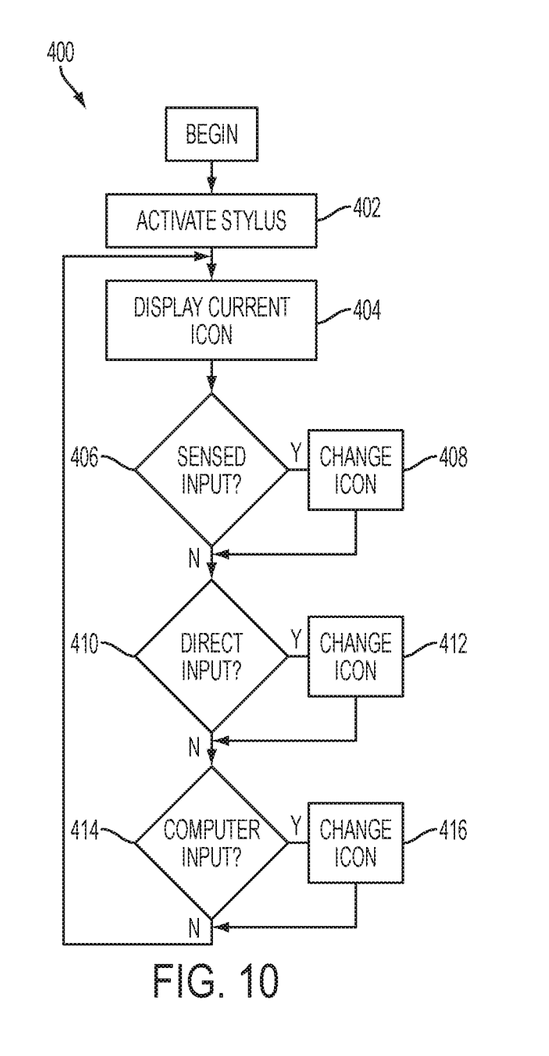
FIG. 10 is a flow chart illustrating a method for dynamically providing indication to a user based on multiple parameters.

As briefly discussed above with respect to FIG. 9, the graphic display 112 may be varied based on a number of different parameters. A method for changing the graphic display 112 based on multiple parameters will now be discussed. FIG. 10 is a flow chart illustrating a method for using the stylus to provide indication to a user based on multiple parameters. With reference to FIG. 10, the method 400 may begin with operation 402 and the stylus 104 is activated. As with operation 302, in operation 402 the stylus 104 may be activated in a number of different manners. In one example, the stylus 104 may be activated when one or more of the sensors 128 detect a user input (e.g., the accelerometer detecting that the stylus is moving) or when one of the switches 118, 120 are activated.

Once the stylus 104 has been activated, the method 400 may proceed to operation 404. In operation 404, the graphic display 404 displays a graphic, such as an icon or character, corresponding the current attributes of the stylus 104. After operation 306, the method 400 proceeds to operation 406. In operation 406, the processing element 130 may analyze data from the one or more sensors 128 to determine if a sensed input has been changed. For example, the processing element 130 may determine whether an angle or tilt of the stylus 104 has been changed, whether a pressure exerted on the body 114 or nib 116 has increased, or whether the user has changed his or her grip on the body 114.

If one or more of the sensors 128 have a sensed input change, the method 400 proceeds to operation 408 and the graphic displayed on the graphic display 112 is changed correspondingly. As an example, if the stylus positioned at a smaller angle relative to the screen (e.g., tilted), the graphic may be varied to indicate an angled line or other variation in presentation data. After operation 408 or if there is no change detected by the sensors 128, the method proceeds to operation 410.

In operation 410, the processing element 130 may determine whether any direct user input has been received. For example, the processing element 130 may determine whether a user has activated one or more switches 118, 120. As a specific example, the processing element 130 may determine whether a user has rotated the first switch 118, which may indicate that the user wishes to change the output thickness, color, type, or the like, of the stylus 104.

If a direct user input is detected, the method 400 proceeds to operation 412 and the graphic on the graphic display 112 is updated according to the change in the stylus state corresponding to the direct user input. For example, rotation of the first switch may correspond to a change in color of the presentation data the color of the graphic may be changed accordingly. After operation 412, or if no direct input is detected in operation 410, the method 400 proceeds to operation 414.

In operation 414, the processing element 130 determines whether a computer input has been varied. For example, the computing device 102 may transmit data to the stylus 104 (e.g., through the I/O component 122 or the nib 116) indicating a change corresponding to the presentation data illustrated on the display 106. As one example, the computing device 102 may transmit data corresponding to the active application, which may control one or more characteristics of the presentation data. As an example, if a painting application is active, the presentation data may be a first type of line or spray, whereas if a note-taking application is active, the output of the stylus may have a type face or a second type of line display. As another example, the user may provide input to the computing device 102, either through the stylus 104 or otherwise, that may be used to change the features of the presentation data. Continuing with this example, the user may select a graphic on the display or provide another type of input that may change a color, brush type, line thickness, or the like, of the presentation data corresponding to the stylus input to the computing device.

If the computing device 102 has a change in the presentation data, the computing device 102 transfers data corresponding to the change to the stylus 104, such as to the I/O component 122. The method 400 then proceeds to operation 416 and the processing element 130 changes the graphic on the graphic display 112 to correspond to the change in presentation data. Once the graphic has been changed in operation 416 or if in operation 414 there is no change, the method 400 returns to operation 404.

Using the method 400, the user may be provided indication corresponding to substantially any change in the presentation data of the stylus, whether it be sensed changes, user input changes, or those from the computing device.

CONCLUSION

The foregoing description has broad application. For example, while examples disclosed herein may focus on stylus embodiments, it should be appreciated that the concepts disclosed herein may equally apply to substantially any other type of input device. Similarly, although the input device and receiving unit may be discussed with touch screens, the devices and techniques disclosed herein are equally applicable to other types of capacitive coupling systems. Accordingly, the discussion of any embodiment is meant only to be exemplary and is not intended to suggest that the scope of the disclosure, including the claims, is limited to these examples.

What is claimed is:

1. A stylus for providing input to a computing device, the stylus comprising:
   a body configured to be gripped by a user;
   a tip;
   a force sensor operable to detect an amount of a force applied to the tip;
   a stylus display configured to display a first graphic, wherein the stylus display changes a color of the first graphic based on changes in the amount of the force applied to the tip; and
   a communication unit operable to instruct the computing device to display a second graphic on a computing device display of the computing device and in response to movement of the tip across a surface of the computing device display, the second graphic having the color of the first graphic.

2. The stylus of claim 1, wherein
   when the force sensor senses an increase in the force applied to the tip, a size of the first graphic increases; and
   when the force sensor senses a decrease in the force applied to the tip, the size of the first graphic decreases.

3. The stylus of claim 1, wherein the stylus display is positioned on an end of the body opposite the tip.

4. The stylus of claim 1, wherein the stylus display extends longitudinally along a length of the body, and a length of the first graphic is based on a parameter of the stylus.

5. The stylus of claim 4, wherein the parameter is a battery life of the stylus.

6. The stylus of claim 1, wherein the stylus display is positioned around a portion of the tip.

7. The stylus of claim 1, wherein the stylus display is defines a portion of a tapered end of the stylus.

8. A stylus for providing input to an electronic device having a screen, comprising:
   a body configured to be gripped by a user;
   a tip connected to a first end of the body; and
   a display connected to the body, the display providing a graphic having a dimension and a color, wherein:
      the dimension of the graphic corresponds to a dimension of an output for display on the screen; and
      the color of the graphic corresponds to a color of the output for display on the screen; and
      the display changes:
         the dimension of the output when the dimension of the graphic changes on the display of the stylus; and
         the color of the output when the color of the graphic changes on the display of the stylus.

9. The stylus of claim 8, further comprising a force sensor, wherein:
   when the force sensor senses an increase in a force applied to the tip, a size of the first graphic increases; and
   when the force sensor senses a decrease in the force applied to the tip, the size of the first graphic decreases.

10. The stylus of claim 8, wherein the stylus display is positioned on an end of the body opposite the tip.

11. The stylus of claim 8, wherein the stylus display extends longitudinally along a length of the body, and a length of the first graphic is based on a parameter of the stylus.

12. The stylus of claim 11, wherein the parameter is a battery life of the stylus.

13. The stylus of claim 8, wherein the stylus display is positioned around a portion of the tip.

14. The stylus of claim 8, wherein the stylus display is defines a portion of a tapered end of the stylus.

15. A stylus for providing input to a computing device, the stylus comprising:
- a body;
- a tip connected to an end of the body;
- a stylus display configured to display a first graphic having a first pattern and a color; and
- a communication unit operable to instruct the computing device to display a second graphic on a computing device display of the computing device and in response to movement of the tip across a surface of the computing device display, the second graphic having a second pattern that is graphically the same as the first pattern and the color of the first graphic.

16. The stylus of claim 15, wherein the stylus comprises a force sensor operable to detect an amount of a force applied to the tip.

17. The stylus of claim 16, wherein
when the force sensor senses an increase in the force applied to the tip, a size of the first graphic increases; and
when the force sensor senses a decrease in the force applied to the tip, the size of the first graphic decreases.

18. The stylus of claim 15, wherein the stylus display extends longitudinally along a length of the body, and a length of the first graphic is based on a parameter of the stylus.

19. The stylus of claim 18, wherein the parameter is a battery life of the stylus.

20. The stylus of claim 15, wherein the stylus display is positioned around a portion of the tip.

* * * * *

UNITED STATES PATENT AND TRADEMARK OFFICE
CERTIFICATE OF CORRECTION

PATENT NO. : 11,353,969 B2
APPLICATION NO. : 17/009682
DATED : June 7, 2022
INVENTOR(S) : Christopher J. Stringer Page 1 of 1

It is certified that error appears in the above-identified patent and that said Letters Patent is hereby corrected as shown below:

In the Claims

Column 16, Line 44 (Claim 7): Replace "wherein the stylus display is" with --wherein the stylus display--.

Column 17, Line 11 (Claim 14): Replace "wherein the stylus display is" with --wherein the stylus display--.

Signed and Sealed this
Eighth Day of November, 2022

Katherine Kelly Vidal
*Director of the United States Patent and Trademark Office*